(12) United States Patent
Kakiuchi et al.

(10) Patent No.: US 7,782,738 B2
(45) Date of Patent: Aug. 24, 2010

(54) PHASE PLATE AND OPTICAL HEAD DEVICE

(75) Inventors: Toshimasa Kakiuchi, Koriyama (JP);
Koichi Murata, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 412 days.

(21) Appl. No.: 11/874,547

(22) Filed: Oct. 18, 2007

(65) Prior Publication Data

US 2008/0044125 A1 Feb. 21, 2008

Related U.S. Application Data

(63) Continuation of application No. PCT/JP2006/308225, filed on Apr. 19, 2006.

(30) Foreign Application Priority Data

Apr. 20, 2005 (JP) ............................. 2005-122609

(51) Int. Cl.
*G11B 7/00* (2006.01)
(52) U.S. Cl. .............................. 369/112.18; 369/112.02
(58) Field of Classification Search ............ 369/112.02, 369/112.22, 112.01, 112.16, 112.17–112.19, 369/44.23, 110.04
See application file for complete search history.

(56) References Cited

U.S. PATENT DOCUMENTS

| 5,519,685 | A | * | 5/1996 | Kato et al. ............. | 369/112.19 |
| 6,069,859 | A | * | 5/2000 | Hayashi et al. ........ | 369/112.03 |
| 6,185,168 | B1 | * | 2/2001 | Kato et al. ............... | 369/44.23 |
| 6,426,933 | B1 | * | 7/2002 | Jeong et al. ............ | 369/112.17 |
| 7,463,569 | B2 | * | 12/2008 | Nishiwaki et al. ...... | 369/112.17 |
| 2003/0123371 | A1 | * | 7/2003 | Nishiyama et al. ..... | 369/112.17 |
| 2004/0246874 | A1 | | 12/2004 | Takagi et al. | |
| 2005/0237902 | A1 | | 10/2005 | Nishiwaki et al. | |
| 2006/0239171 | A1 | * | 10/2006 | Ooi et al. ................ | 369/112.16 |
| 2006/0250933 | A1 | * | 11/2006 | Asada et al. ........... | 369/112.01 |

FOREIGN PATENT DOCUMENTS

| JP | 7-318862 A | 12/1995 |
| JP | 10-124906 A | 5/1998 |

(Continued)

*Primary Examiner*—Thang V Tran
(74) *Attorney, Agent, or Firm*—Oblon, Spivak, McClelland, Maier & Neustadt, L.L.P.

(57) ABSTRACT

A phase plate and an optical head device are provided, which are capable of suppressing changes of the amount of light incident on a light-receiving unit even if the phase difference caused by transmission through a protective layer of an optical recording medium differs depending on the type of optical recording medium.

The phase plate includes a birefringent medium and produces a phase difference in linearly polarized light incident on the phase plate between a polarization component having a polarization direction parallel to the optic axis of the birefringent medium and a polarization component having a polarization direction perpendicular to the optic axis. In the phase plate, the birefringent medium includes a plurality of types of phase areas disposed adjacently; at least two types of adjacent phase areas are different from each other in phase differences, optic axes, or both phase differences and optic axes; and each of the plurality of types of phase areas is disposed so as to have two-fold rotational symmetry with respect to the optical axis of the phase plate.

7 Claims, 8 Drawing Sheets

FOREIGN PATENT DOCUMENTS

| | | |
|---|---|---|
| JP | 2000-260035 A | 9/2000 |
| JP | 2001-305340 A | 10/2001 |
| JP | 2002-250815 | 9/2002 |
| JP | 2004-355790 A | 12/2004 |
| JP | 2005-339766 A | 12/2005 |

\* cited by examiner (a)

(b)

PHASE PLATE AND OPTICAL HEAD DEVICE

BACKGROUND OF THE INVENTION

1. Field of the Invention

The present invention relates to a phase plate and an optical head device both used for writing and reading optical information, and more particularly, to a phase plate and an optical head device both used for writing and reading optical information to and from a plurality of predetermined types of optical-recording media, such as CDs and DVDs.

2. Discussion of Background

In a conventional optical head device which writes optical information on an optical recording medium, such as a CD or DVD, and reads the recorded optical information, light returning from the optical recording medium is separated by using polarization of light in order to perform optical information reading and actuate focusing servo and tracking servo. FIG. 10 conceptually shows an example of the structure of a conventional optical head device 300. The operation of the conventional optical head device 300 is described below.

A light beam (hereinafter called P polarized beam) emitted from a light source 1 for emitting a plurality of light beams having different wavelengths such as a twin-laser unit, passes through a polarizing beam splitter 2 such as a polarizing hologram element, is transmitted through a phase plate 10 to be transformed into a circularly polarized beam, and is transmitted through a collimator lens 3 and an objective lens 4 to be incident on an optical recording medium 20. The incident light is reflected by the optical recording medium 20 to be returning light. This returning light is transmitted through the objective lens 4 and the collimator lens 3, transmitted through the phase plate 10 to be transformed into a light beam (hereinafter referred to as S polarized light beam) polarized in a direction perpendicular to is that of the light beam emitted from the light source 1, split from the incident light by the polarizing beam splitter 2, incident on a light receiving unit 5, and converted to an electrical signal by the light-receiving unit 5.

In recent years, optical head devices generally write and/or read optical information to and/or from a plurality of predetermined types of optical recording media, such as CDs or DVDs. For convenience of description, it is assumed here that the optical recording media handled by optical head devices are CDs and DVDs. The optical recording media have a protective layer on an information recording plane, and the thickness of the protective layer generally differs according to the type of optical recording media. The protective layer has birefringence. As a result, the polarization of light reflected by each optical recording medium differs depending on its type, and shift of polarization from the S polarization also differs. Specifically, the protective layer on the information recording plane in CDs is thicker than the protective layer in DVDs, and therefore, light reflected by a CD greatly shifts from the S polarization.

Accordingly, in such a conventional optical head device, there is a problem that since light returning from an optical recording medium such as a CD having a thick protective layer greatly shifts from the S polarization when the light is transmitted though a phase plate, the amount of light incident on the light receiving unit is significantly reduced in some cases.

SUMMARY OF THE INVENTION

The present invention has been made to overcome the above-described problem, and it is an object of the present invention to provide a phase plate and an optical head device capable of suppressing a change in the amount of light incident on the light receiving unit even if the phase difference due to transmission through the protective layer changes depending on the type of optical recording medium.

According to a first aspect of the present invention, there is provided a phase plate including a birefringent medium, for producing a phase difference in linearly polarized light incident on the phase plate between a polarization component having a polarization direction parallel to an optic axis of the birefringent medium and a polarization component having a polarization direction perpendicular to the optic axis, wherein the birefringent medium includes a plurality of types of phase areas arranged adjacently; at least two types of adjacent phase areas among the plurality of types of phase areas are different from each other in a phase difference, an optic axis, or a phase difference and an optic axis; and each of the plurality of types of phase areas is disposed so as to have two-fold rotational symmetry with respect to the optical axis of the phase plate.

With this configuration, since at least two types of adjacent phase areas among the plurality of types of phase areas are different from each other in a phase difference, an optic axis, or a phase difference and an optic axis; and each of the plurality of types of phase areas is disposed so as to have two-fold rotational symmetry with respect to the optical axis of the phase plate, the phase plate can suppress changes in the amount of light incident on a light receiving unit even if the phase difference caused by the transmission through a protective layer of an optical recording medium differs depending on the type of optical recording medium.

According to a second aspect of the present invention, there is provided the phase plate wherein the birefringent medium comprises a first-type phase area and a second-type phase area; and the phase difference produced by the first-type phase area differs from the phase difference produced by the second-type phase area.

With this configuration, in addition to the advantage described above, the phase plate can have a simple configuration because there are only two types of phase areas.

According to a third aspect of the present invention, there is provided the phase plate wherein a part or the whole of the birefringent medium is made of a liquid crystal; a plurality of channels is provided in each of the plurality of types of phase areas so as to contact the liquid crystal and so as to be parallel to the optic-axis direction of the phase area; and the liquid crystal is aligned along the plurality of channels.

With this configuration, in addition to the advantage described above, liquid-crystal alignment can be easily performed in the phase plate because the liquid crystal is aligned along the plurality of channels provided in each of the plurality of types of phase areas so as to contact the liquid crystal and so as to be parallel to the optic-axis direction of the phase area.

According to a fourth aspect of the present invention, there is provided the phase plate wherein a part or the whole of the birefringent medium is made of a polymer liquid crystal.

With this configuration, in addition to the advantage described above, fabrication of the phase plate becomes easy because a part or the whole of the birefringent medium is made from polymer liquid crystal.

According to a fifth aspect of the present invention, there is provided an optical head device comprising a light source for emitting light, an objective lens for focusing the light emitted from the light source onto an optical recording medium, a light-receiving unit for detecting light returning from the optical recording medium, wherein the optical head device further comprises is the phase plate described above, disposed in an optical path between the objective lens and the light source, and wherein the light returning from the optical recording medium is transmitted through the phase plate.

With this configuration, the optical head device has the advantage described above.

According to a sixth aspect of the present invention, there is provided the optical head device which further comprises a polarizing beam splitter in an optical path between the light source and the phase plate.

With this configuration, in addition to the advantage described above, the optical head device has high utilization efficiency of light.

According to a seventh aspect of the present invention, there is provided the optical head device wherein the light source can emit light having a plurality of different wavelengths; phase differences produced when light having at least one of the plurality of different wavelengths is transmitted through the plurality of types of phase areas are each $(90 \times m + 360 \times k + \alpha)$ degrees where m indicates an integer of −1 or +1, k indicates an integer, and $\alpha$ indicates a real number of at least −20 and at most +20; and differences between the phase differences produced when light having at least one of the plurality of different wavelengths is transmitted through the plurality of types of phase areas are each $(360 \times j + \beta)$ degrees where j indicates an integer, and $\beta$ indicates a real number of at least −40 and at most +40.

With this configuration, in addition to the advantage described above, the optical head device having good writing and reading characteristics is realized because the phase plate functions as a $\lambda/4$ phase plate for an optical recording medium having a small birefringence effect, such as a DVD, and also functions as an area-division phase plate for an optical recording medium having a large birefringence effect, such as a CD, when light having one wavelength among the plurality of wavelengths is used for writing and reading the optical recording medium having the large birefringence effect, and light having a different wavelength is used for writing and reading the optical recording medium having the small birefringence effect.

According to the present invention, since at least two types of adjacent phase areas are different from each other in at least one of the phase difference and the optic axis; and each phase area is disposed so as to have two-fold rotational symmetry with respect to the optical axis of the phase plate, the phase plate can suppress changes in the amount of light incident on a light-receiving unit even if the phase difference produced by the transmission through a protective layer of an optical recording medium differs depending on the type of optical recording medium.

EXPLANATION OF REFERENCE NUMERALS

Figure 1:
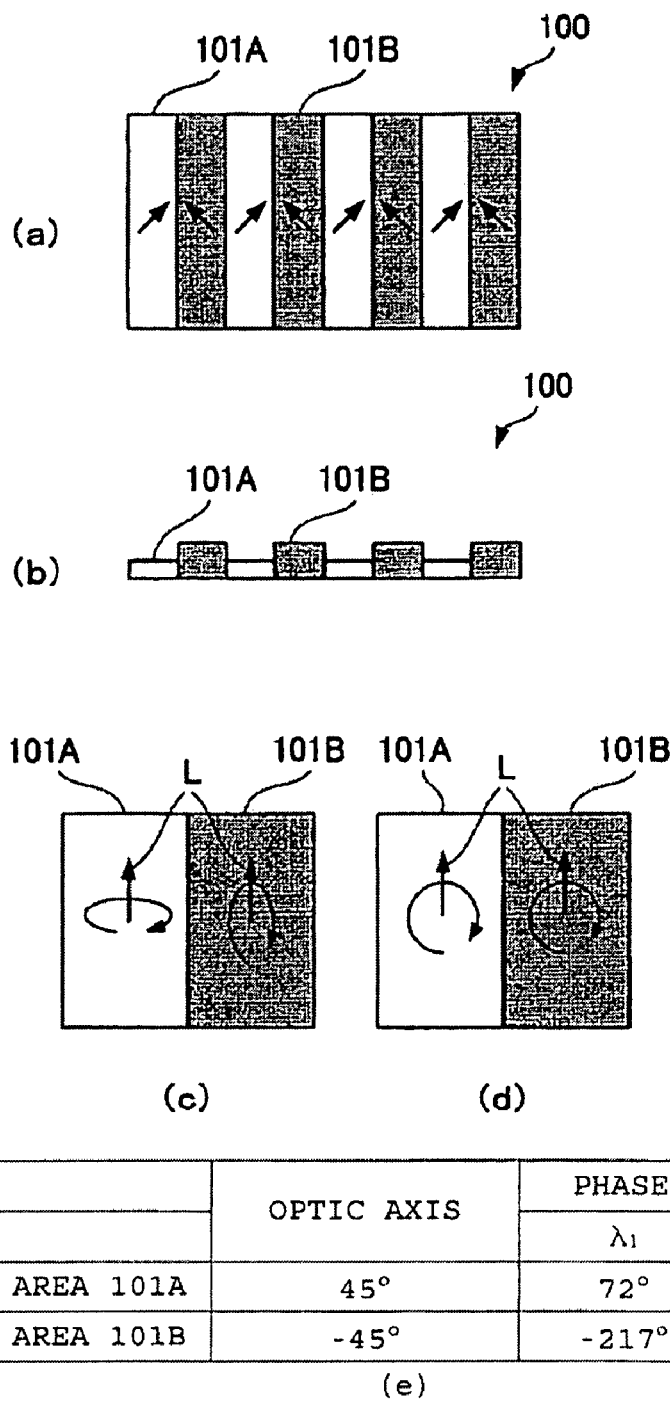
FIGS. 1(a) to 1(e) are explanation views showing a phase plate according to an embodiment of the present invention.

1: light source
2: polarizing beam splitter (polarizing hologram)
3: collimator lens
4: objective lens
5: light-receiving unit
10, 100, 510, 520, 600, 800: phase plate
20: optical recording medium
101A, 101B, 511A, 511B, 521A, 521B: phase area
200, 300: optical head device
311, 312, 321, 322: rotational direction of Stokes vector produced by phase plate
313, 314: position of Stokes vector after it is rotated by phase plate
331, 332: rotational direction of Stokes vector produced by optical recording medium
601A, 601B, 801A, 801B: glass substrate
602A, 602B, 802, 802A, 802B: polymer liquid crystal
603, 803: filler
614A, 614B, 804: seal
611A, 611B, 811: supporting glass plate
812A, 812B: SiON film
L: P-polarization direction

DETAILED DESCRIPTION OF THE PREFERRED EMBODIMENTS

Embodiments of the present invention will be described below with reference to the drawings.

FIGS. 1(a) to 1(e) show a phase plate 100 according to an embodiment of the present invention. FIG. 1(a) is a plan view schematically showing the construction of the phase plate 100. In FIG. 1(a), the phase plate 100 includes first-type phase areas 101A and second-type phase areas 101B.

Each of the phase areas 101A and 101B is a stripe area in a birefringent medium, and the width (hereinafter referred to as "stripe width") of each stripe area in a direction perpendicular to the longitudinal direction thereof is sufficiently smaller than the diameter of a light flux used. Specifically, the stripe width is several tens of μm to several hundreds of μm, when the diameter of the light flux is several millimeters. For example, when the light flux has a diameter of 3.1 mm, the stripe width is set to about 100 μm. In addition, the phase areas 101A and 101B have different optic axes and different phase differences from each other.

The phase differences and the directions of the optic axes in the phase areas 101A and 101B can be set to various values. For convenience of description, it is assumed that two light beams having different wavelengths $\lambda_1$ and $\lambda_2$ ($\lambda_1 > \lambda_2$) are incident on the phase plate. The phase areas 101A and 101B cause different phase differences for at least one of the light beams having the wavelengths $\lambda_1$, and $\lambda_2$. It is preferred that the difference between the phase differences is $(90 \times m + 360 \times$ k+α) degrees, where "m" is −1 or 1, "k" is an integer, and α is preferably at least from −20 degrees and at most +20.

It is further preferred that α is at least −10 degrees and at most +10 degrees. It is further preferred that α is zero degree. This is because, when α is close to zero degree, if a linearly-polarized light beam of wavelength $\lambda_2$ is incident on the phase plate, it is almost converted to a circularly polarized light beam; and, when a light beam reflected from the optical recording medium is again transmitted through the phase plate, the light beam is converted to a linearly polarized light beam in a direction perpendicular to the incident polarization direction, and thereby the light beam can be efficiently guided to the light-receiving unit.

Further, it is preferred that the difference between the phase differences caused by the phase plates 101A and 101B for one of the light beams having the wavelengths $\lambda_1$ and $\lambda_2$ is (360× j+β) degrees, where "j" is an integer, and β is at least −40 degrees and at most +40 degrees. It is further preferred that β is at least −20 degrees and at most +20 degrees. It is further preferred that "j" is not zero and β is zero degree. This is because, when light beams having a wavelength of $\lambda_2$ are transmitted through the phase areas 101A and 101B, respectively, of the phase plate, they have almost the same polarization state, and thereby uniform polarization can be achieved in a light flux.

Here, the phase difference described above means a phase difference in incident light between a phase of a polarization component having a polarization direction parallel to the optic axis of the birefringent medium and a phase of a polarization component having a polarization direction perpendicular to the optic axis. FIG. 1(b) is a cross-sectional view schematically showing the cross-sectional construction of the phase plate 100. In FIG. 1(a), the directions of optic axes are indicated by arrows to show that the phase areas 101A and 101B have different optic-axis directions. FIG. 1(b) shows that the phase areas 101A and 101B have birefringent media of different thickness. It is assumed here that the optic axes of the phase areas 101A and 101B are tilted by 45 degrees in opposing directions with respect to the boundary between the phase areas 101A and 101B.

As stated earlier, for convenience of description, it is assumed that two light beams having different wavelengths $\lambda_1$ and $\lambda_2$ ($\lambda_1 > \lambda_2$) are incident on the phase plate 100. Specifically, for example, the light beam having the wavelength $\lambda_1$ (780 nm band) is used for writing and reading CDs, and the light beam having the wavelength $\lambda_2$ (660 nm band) is used for writing and reading DVDs. The phase differences of the phase areas 101A and 101B are 72 degrees and −217 degrees respectively for the wavelength $\lambda_1$ and 90 degrees and −270 degrees respectively for the wavelength $\lambda_2$. The above phase differences for the wavelength $\lambda_1$ are of an example in which m=1, k=0, and α=−18 for the phase area 101A and m=1, k=−1 and α=53 for the phase area 101B, and the difference between the phase differences is j=1 and β=−71. In the same manner, the phase differences for the wavelength $\lambda_2$ are of an example in which m=1, k=0 and α=0 for the phase area 101A and m=1, k=−1 and α=0 for the phase area 101B, and the difference between the phase differences is j=1 and β=0.

It is assumed here that the incident light is linearly polarized light of P polarization, and that the polarization direction is parallel to the boundary between the phase areas 101A and 101B, as indicated by arrows L in FIG. 1(c) and FIG. 1(d). It is also assumed that the center of the phase area 101A or the phase area 101B is located on the optical axis, and that the phase areas 101A and 101B are arranged so as to have two-fold rotational symmetry with respect to the optical axis.

As a result, in the incident light of wavelength $\lambda_2$, a light beam incident on the first-type phase area 101A and a light beam incident on the second-type phase area 101B are transmitted through the phase plate 100 as light is beams having substantially the same polarization state (circular polarization), and returning light beams are also transmitted through the same types of phase areas as the incident light. On the other hand, in the incident light of wavelength $\lambda_1$, a light beam incident on the first-type phase area 101A and a light beam incident on the second-type phase area 101B are transmitted through the phase plate 100 as light beams having different polarization states (elliptical polarization).

For convenience of description, it is assumed here that the phase difference caused by birefringence in optical recording media for which light of wavelength $\lambda_2$ is used for writing and reading is very small and can be ignored when the light is transmitted through the protective layer. In the construction described above, the phase plate 100 functions as a ¼ wavelength plate for light of wavelength $\lambda_2$. Further, for light of wavelength $\lambda_1$, the phase plate 100 functions as described below.

Figure 2:
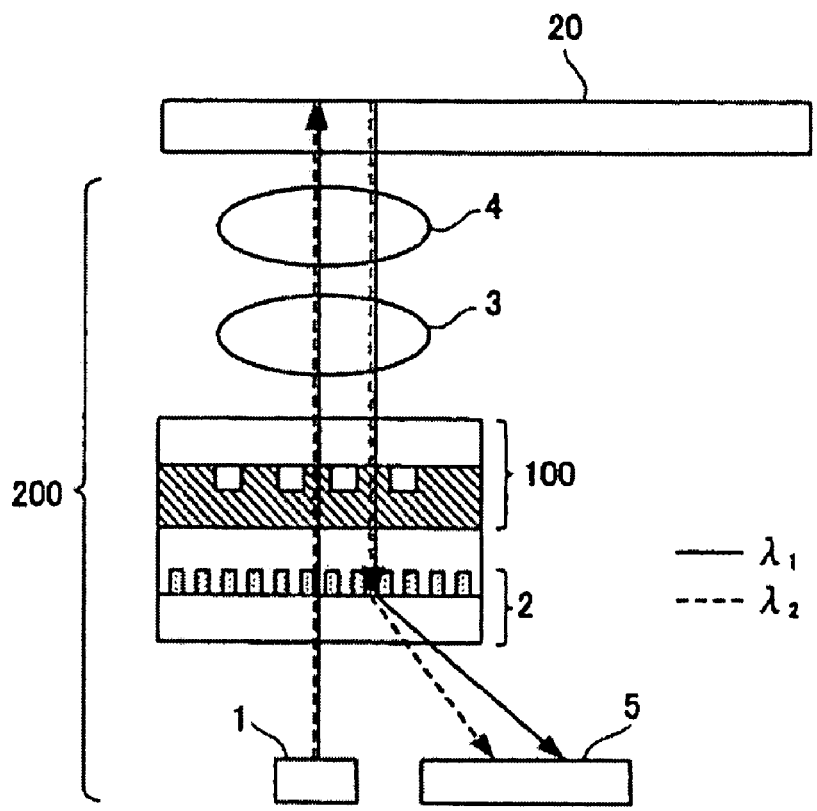
FIG. 2 is a view schematically showing the construction of an optical head device according to another embodiment of the present invention.

It is assumed here, as shown in FIG. 2, that an optical head device 200 is constituted by a light source 1, a polarizing beam splitter 2 constituted by e.g. a prism-shaped beam splitter, a polarizing diffraction element and a polarizing hologram element, the phase plate 100, a collimator lens 3, an objective lens 4, and a light-receiving unit 5. Provided that Si indicates the Stokes vector of light incident on the phase plate 100 and So indicates the Stokes vector of light incident on the photo-receiving unit 5, the Stokes vector So is represented by the following Formula (1):

$$So = P \times B \times M \times F \times Si \quad (1)$$

Here, P indicates a transformation matrix which shows a change of polarization state produced by the polarizing beam splitter 2; B indicates a transformation matrix which shows a change of polarization state until returning light reflected from an information recording plane of an optical recording medium 20 is transmitted through the phase plate 100; M indicates a transformation matrix which shows a change in polarization state caused by reflection at the information recording plane; F indicates a transformation matrix which shows a change in polarization state from when the light is incident on the phase plate 100 to when it reaches the information recording plane. Further, the Stokes vector Si is $[1, 1, 0, 0]^T$ where T indicates transpose.

The transformation matrixes F and B indicate changes of polarization states caused by the phase plate 100 and the protective layer of the optical recording medium 20 in an outgoing path and a returning path, respectively, and each can be further divided into the following two transformation matrixes:

$$F = G(\theta d, \Gamma d) G(\theta p, \Gamma p) \quad (2)$$

$$B = G(\pi - \theta p, \Gamma p) G(\pi - \theta d, \Gamma d) \quad (3)$$

Where θp indicates the angle (hereinafter simply referred to as optic angle) between the optic axis of the phase plate 100 and the polarization direction of the P polarization; and θd indicates the optic angle of the protective layer of the optical recording medium 20.

In this embodiment, the optic angle θp of the phase plate 100 is 45 degrees or −45 degrees; Γp indicates a phase difference produced in the phase plate 100, and Γd indicates a phase difference (hereinafter referred to as intra-protective-layer phase difference) produced in the protective layer of the optical recording medium 20. Γp differs depending on wavelength and which differs between the phase areas 101A and 101B.

The transformation matrix G(θ, Γ) can be further divided into the following three transformation matrixes:

$$G(\theta, \Gamma d) = T(\theta) C(\Gamma) T(-\theta) \quad (4)$$

$$T(\theta) = \begin{bmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{bmatrix} \quad (5)$$

$$C(\Gamma) = \begin{bmatrix} 1 & 0 & 0 & 0 \\ 0 & 1 & 0 & 0 \\ 0 & 0 & \cos(\Gamma) & \sin(\Gamma) \\ 0 & 0 & -\sin(\Gamma) & \cos(\Gamma) \end{bmatrix} \quad (6)$$

Here, T(θ) in Formula (4) is an optical rotation matrix which is a transformation matrix that rotates the Stokes vector by 2θ around the S3 axis of the Poincare sphere, as shown in Formula (5). Further, C(Γ) is a retardance matrix which is a transformation matrix that rotates the Stokes vector by Γ around the S1 axis of the Poincare sphere, as shown in Formula (6).

The transformation matrix M, called as a mirror matrix, and the transformation matrix P, called a polarizer matrix which polarizes the S polarization by e.g. reflection and diffraction, are also represented by the following Formulae (7) and (8):

$$M = \begin{bmatrix} 1 & 0 & 0 & 0 \\ 0 & 1 & 0 & 0 \\ 0 & 0 & -1 & 0 \\ 0 & 0 & 0 & -1 \end{bmatrix} \quad (7)$$

$$P = \begin{bmatrix} 0.5 & -0.5 & 0 & 0 \\ -0.5 & 0.5 & 0 & 0 \\ 0 & 0 & 0 & 0 \\ 0 & 0 & 0 & 0 \end{bmatrix} \quad (8)$$

Figure 3:
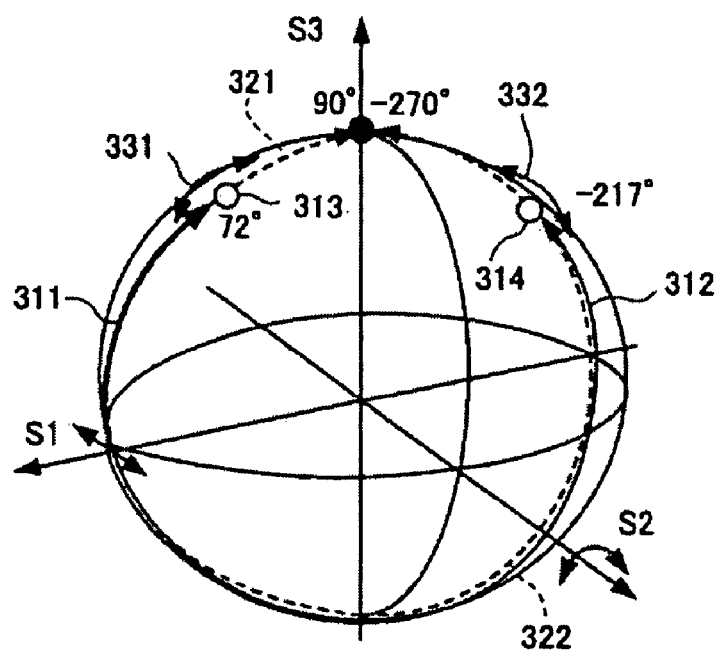
FIG. 3 is a view showing changes in polarization states caused by transmission through phase areas in an outgoing path.

The Stokes vector of light of wavelength $\lambda_1$ moves to a point 313 by 72 degrees in a direction indicated by an arrow 311 as shown in FIG. 3 when the light is transmitted through the phase area 101A in the outgoing path, and moves to a point 314 by 217 degrees in a direction indicated by an arrow 312 when the light is transmitted through the phase area 101B. On the contrary, the Stokes vector of light of wavelength $\lambda_2$ moves to the S3 axis by 90 degrees in a direction indicated by an arrow 321 when the light is transmitted through the phase area 101A, and moves to the S3 axis by −270 degrees in a direction indicated by an arrow 322 when the light is transmitted through the phase area 101B.

Figure 4:
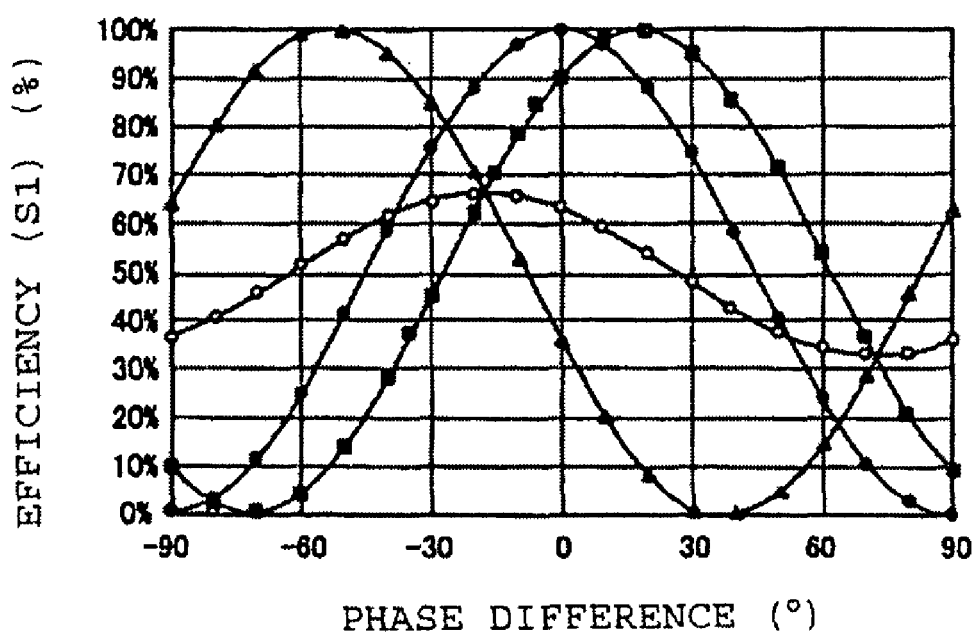
FIG. 4 is a graph showing S-polarization components, at a light-receiving unit, of light returning from an optical recording medium.

FIG. 4 shows the second-row components (hereinafter referred to as S1 components) of the Stokes vectors So of light beams passing through the phase areas 101A and 101B, the S1 component of a light beam passing through an area causing a phase difference of 90 degrees and the average of the S1 components of light beams transmitted through the phase areas 101A and 101B, as functions of the phase difference Γd of the protective layer, assuming that the optic angle θd of the protective layer of the optical recording medium 20 is 45 degrees. The rotation directions of the Stokes vector when the light is transmitted through the protective layer of the optical recording medium 20 when the optic angle is θd are indicated by arrows 331 and 332 in FIG. 3.

In FIG. 4, a curve plotted with symbols ● indicates changes of the S1 component obtained when a phase difference of 90 degrees is produced by the phase plate (hereinafter referred to as 90-degree S1 component); a curve plotted with symbols ■ indicates changes of the S1 component of the light transmitted through the phase area 101A (hereinafter referred to as 72-degree-area S1 component); a curve plotted with symbols ▲ indicates changes of the S1 component of the light transmitted through the phase area 101B (hereinafter referred to as 217-degree-area S1 component); and a curve plotted with symbols ○ indicates changes of the average of the S1 components of light beams transmitted through the phase areas 101A and 101B (hereinafter referred to as interdivisional-average S1 component).

As shown in FIG. 4, the 90-degree S1 component, the 72-degree-area S1 component, and the 217-degree-area S1 component change in the range of from 0% to 100% when the phase difference Γd of the protective layer changes about the S2 axis in the range from −90 degrees to +90 degrees. On the contrary, the interdivisional-average S1 component changes within a narrower range around 50%, as shown in FIG. 4, since the effect caused by the changes of the phase difference Γd of the protective layer is reduced.

In other words, even when the phase difference Γd of the protective layer of the optical recording medium 20 changes, the changes of the amount of the S-polarized light emitted from the phase plate 100 can be suppressed to a narrow range around 50% of the amount of incident light.

The operation of the phase plate 100 according to the embodiment of the present invention will be described below. Of the light of wavelength $\lambda_1$ incident on the phase plate 100, a part which is transmitted through the phase area 101A becomes elliptically polarized light with a phase shift of 72 degrees and a part which is transmitted through the phase area 101B becomes elliptically polarized light with a phase shift of −217 degrees, because the incident light is P polarized light. Then, the elliptically polarized light, output from the phase plate 100, is transmitted through the protective layer of the optical recording medium 20, thus having a polarization state with a predetermined phase difference added thereto.

Light which is transmitted through the protective layer of the optical recording medium 20 and reaches the information recording plane has its Stokes vector rotated according to the optic angle θd and the phase difference Γd of the protective layer of the optical recording medium 20. Each element of the Stokes vector changes differently between light transmitted through the phase area 101A and light transmitted through the phase area 101B. In the same way, of light reflected from the information recording plane of the optical recording medium 20, each element of the Stokes vector changes differently between light transmitted through the phase area 101A and light transmitted through the phase area 101B.

As a result, light transmitted through the phase area 101A and light transmitted through the phase area 101B have different changes of their S1 components when they are transmitted through the protective layer of the optical recording medium 20. Even when light transmitted through one of the phase areas has a reduced S1 component, light transmitted through the other phase area does not have a similarly reduced S1 component. Consequently, unlike a case where a phase plate is formed of only one type of phase area, a change of S1 component obtained upon transmission through the protective layer of the optical recording medium 20 can be suppressed.

In the above construction, the stripe phase areas are alternately arranged when they are observed from the incident direction of light. However, the present invention is not limited to such a construction. The present invention can be also applied to other constructions such as a construction of FIG. 5(a) in which circular or annular areas having different optic-axis directions are alternately arranged, or to a construction of FIG. 5(b) in which triangular areas having different optic-axis directions are alternately arranged to form a parasol shape.

Figure 5:
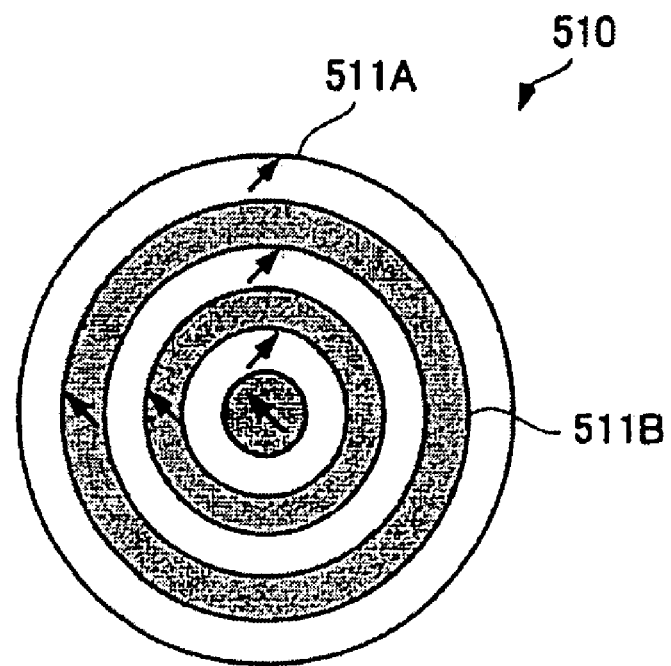
FIGS. 5(a) and 5(b) are plan views of phase plates each being a construction of point symmetry, according to an embodiment of the present invention.
Figure 5:
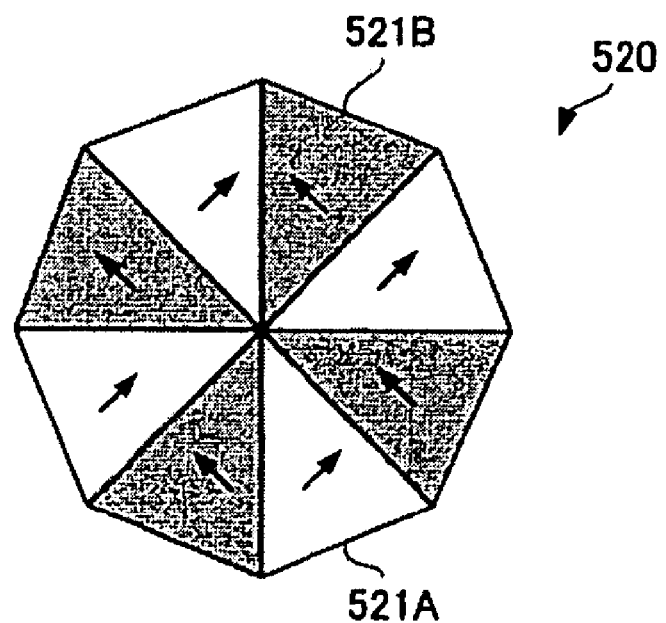

In the construction shown in FIG. 5(a), two types of phase areas 511A and 511B having optic axes tilted by 45 degrees in opposite directions from the polarization direction of P polarization are alternately arranged in radial directions and the center of the circular area is on the optical axis, so that the amounts of light transmitted through the two types of phase areas 511A and 511B are the same. With this construction, since the positioning of the optical axis can be visually performed, easy assembly is realized.

In the construction shown in FIG. 5B, two types of phase areas 521A and 521B having optic axes tilted by 45 degrees in opposite directions from the polarization direction of P polarization are alternately arranged in the circumferential direction and the center of the parasol-shaped phase plate is on the optical axis, so that the amounts of light transmitted through the two types of phase areas 521A and 521B are the same. With this construction, since the positioning of the optical axis can be visually performed, easy assembly is realized.

In addition, the amount of light can be made uniform without taking into account the intensity distribution of light along the radial directions.

The operation of the optical head device 200 according to an embodiment of the present invention will be described below with reference to FIG. 2. P polarized light of wavelength $\lambda_1$ emitted from a light source 1 is transmitted through a polarizing beam splitter 2 designed to transmit P polarization and is incident on a phase plate 100 to become elliptically polarized light composed of a light component having a phase difference of 72 degrees and a light component having a phase difference is of −217 degrees. The elliptically polarized light of wavelength $\lambda_1$ output from the phase plate 100 is transmitted through a collimator lens 3 and an objective lens 4 in this order, and is incident on the optical recording medium 20 for recording and reproducing optical information by using the light of wavelength $\lambda_1$ (hereinafter referred to as optical recording medium for wavelength $\lambda_1$).

The light incident on the optical recording medium 20 for wavelength $\lambda_1$ is transmitted through the protective layer of the optical recording medium 20 for the wavelength $\lambda_1$, whereby its polarization state is changed according to the transformation matrix $G(\theta d, \Gamma d)$, represented by Formula (2). The light transmitted through the protective layer of the optical recording medium 20 for wavelength $\lambda_1$ is reflected by the information recording plane, and its polarization state is changed according to the mirror matrix M, represented by Formula (7). The light reflected by the information recording plane is transmitted through the protective layer of the optical recording medium 20 for wavelength $\lambda_1$ as returning light, whereby its polarization state is changed according to the transformation matrix $G(\pi-\theta d, \Gamma d)$, represented by Formula (3).

The returning light of wavelength $\lambda_1$ output from the optical recording medium 20 is transmitted through the objective lens 4 and the collimator lens 3 in this order, and is incident on the phase plate 100. Each component of the returning light of wavelength $\lambda_1$ is incident on the same type of phase area of the phase plate 100 as it was incident as P polarized light. More specifically, returning light of a light component transmitted through the phase area 101A is also transmitted through the phase area 101A; and returning light of a light component transmitted through the phase area 101B is also transmitted through the phase area 110B.

The returning light of wavelength $\lambda_1$ incident on the phase plate 100 has a polarization state changed according to the transformation matrix $G(\pi-\theta p, \Gamma p)$ represented by Formula (3) unique to the phase area 101A or 101B through which the light is transmitted. Accordingly, the returning light has a S1 component within a narrow range around 0.5, and is incident on the polarizing beam splitter 2. From the returning light incident on the polarizing beam splitter 2, an amount of light according to S1 component is split by the polarizing beam splitter 2 and is incident on the light-receiving unit 5. The light incident on the light-receiving unit 5 is converted to an electrical signal by the light-receiving unit 5.

Light emitted from the light source 1 is transmitted through the polarizing hologram 2 functioning as a polarizing beam splitter, the phase plate 100, and the collimator lens 3, and is focused onto the information recording plane of the optical recording medium 20 by the objective lens 4. Light reflected by the information recording plane is again transmitted through the objective lens 4, the collimator lens 3, and the phase plate 100; is diffracted by the polarizing hologram 2; and is guided to the light receiving unit 5 to provide a disk information signal.

Here, the light source 1 is an optical system capable of emitting light of wavelengths $\lambda_1$ and $\lambda_2$, where, for example, the wavelength $\lambda_1$ is in the 780 nm band corresponding to CDs and the wavelength $\lambda_2$ is in the 650 nm band corresponding to DVDs.

The polarizing hologram 2 exhibits high transmittance (low diffraction efficiency) for light having a first polarization direction emitted from the light source 1, and exhibits high diffraction efficiency (low transmittance) for light having a second polarization direction perpendicular to the first polarization direction. When light having the second polarization direction is reflected by the optical recording medium (disk) and incident on the polarizing hologram 2, the light can be guided to the light-receiving unit 5 with the highest light utilization efficiency.

The phase plate 100 is preferably a $\lambda/4$ phase plate which changes the polarization direction of light reflected by the optical recording medium 20 and to be incident on the polarizing hologram 2, to the second polarization direction. However, the protective layer of the disk may have birefringence. In particular, CDs have large birefringence.

When, in the worst case, the phase difference produced by the disk cancels out the phase difference caused by the phase plate, the polarization direction of reflected light becomes the first polarization direction in which the diffraction efficiency of the polarizing hologram 2 is 0%, and reading of an information on the disk becomes impossible.

As described earlier, in FIG. 4, symbols ● schematically indicate changes of the amount of light having the second linear polarization when the phase difference produced by the disk is changed. If the phase difference produced by the disk is −90 degrees or +90 degrees, the amount of light becomes zero, thus making reading impossible. Since an actual disk is rotating, the amount of light guided to the light receiving unit is greatly changed with time because the direction of optical axis of birefringence in the disk is different and the retardation value ($\Delta n \cdot d$) is different according to positions in the disk where writing or reading is performed. Such changes prevent writing or reading depending on positions in the disk, and a large signal change increases jitter.

To overcome these problems, the present invention provides a phase plate with a plurality of areas producing different phase differences and/or having different optic axis directions. This construction can prevent, even if the disk has birefringence, a case where the birefringence produced by the disk completely cancels out the phase difference produced by the phase plate to make received light amount zero. In addition, the amplitude of time-dependent change of the signal can be reduced. In FIG. 4, symbols ○ schematically indicate changes of the amount of light having the second linear polarization, when a phase plate according to the present invention is used and the phase difference produced by the disk is changed. It is understood that the curve plotted with symbols ○, which uses a phase plate according to the present invention, shows smaller changes in the amount of light than the curve plotted with symbols ●, which uses a conventional phase plate.

From what has been described, it is preferred that the phase plate 100 function as a conventional uniform ¼ wavelength plate for disks having small retardation values in order to increase the light utilization efficiency and that the phase plate 100 shows different phase differences and/or different optic-axis directions depending on areas in the phase plate 100 for disks having large retardation values in order to reduce the effect of the birefringence of the disks.

As a specific example, the phase plate shown in FIGS. 1(a) to 1(e) is constituted by the two types of areas 101A and 101B having different phase differences. The phase differences in the areas are shown in FIG. 1(e). The phase differences in the two areas are +90 degrees and −270 degrees for light of wavelength $\lambda_2$; the phase differences in these areas are (90× m+360×k+α) degrees where m=1, k=0 and α=0 and that where m=1, k=−1 and α=0, respectively; and the difference between the phase differences of these areas becomes 360 degrees (j=1 and β=0 in (360×j+β)). Accordingly, characteristics equivalent to a uniform ¼ wavelength plate are obtained.

When linearly polarized light of wavelength $\lambda_2$ is incident on this phase plate, the light becomes circularly polarized light irrespective of the area where it is transmitted, and uniform polarization state is obtained in the light flux. Thus, the phase plate provides characteristics equivalent to a conventional phase plate (¼ wavelength plate) having uniformity in the plane.

Even phase plates having the same retardation value (Δn·d) have different phase differences (Δn·d/wavelength×360 degrees) at different wavelengths. Therefore, the phase differences in the two areas are +72 degrees and −217 degrees for light of wavelength $\lambda_1$. Namely, the difference between the phase differences of the two areas are 289 degrees (72−(−217)), which can be expressed as (360×j+β(j=1 and β=−71)) degrees.

Generally, DVDs have small retardation values whereas CDs have large retardation values. Therefore, the phase plate functions as a substantially uniform ¼ wavelength phase plate where β=0 as in the foregoing example for light having a wavelength for DVDs in order to increase the light utilization efficiency. The phase plate also gives a uniform polarization state to the light flux, providing good focusing characteristics on the disk. For CDs having high birefringence, the phase plate reduces changes in the amount of light caused by the birefringence of the disk, thus realizing good writing and reading characteristics.

Here, a phase plate has been described in which phase areas having both optic-axis directions and phase differences different from each other are arranged adjacently. However, the present invention is not limited to such a construction. The present invention can also be applied to a construction in which phase areas having an identical optic-axis direction but different phase differences are arranged adjacently.

As described above, the phase plate according to the embodiment of the present invention has at least two types of phase areas arranged adjacently, where their phase differences or their optic-axis directions, or both their phase differences and their optic-axis directions, are different from each other and where two-fold rotational symmetry with respect to the optical axis is provided. Therefore, light beams can be transmitted through the same types of phase areas respectively to generate phase differences, allowing changes in the amount of linearly polarized light having a polarization direction perpendicular to the polarization direction of incident light to be suppressed and also allowing changes in the amount of light incident on a light receiving unit to be suppressed even if the phase difference caused by the transmission through a protective layer of an optical recording medium differs depending on the type of optical recording medium.

Further, since the phase plate is composed of the two-types of phase areas, a simple structure can be achieved.

Further, since liquid crystal is aligned along a plurality of channels provided so as to contact the liquid crystal and so as to be parallel to the optic-axis direction of each phase area, alignment treatment can be easily performed.

Further, since a part or the whole of the birefringent medium is made of a polymer liquid crystal, ease of treatment is provided.

As described above, the optical head device according to the embodiment of the present invention can obtain the advantages of the above-described phase plate.

Further, since the polarizing beam splitter is disposed in the optical path between the light source and the phase plate, the light utilization efficiency is improved.

Further, when light of one wavelength among a plurality of wavelengths is used for writing and reading an optical recording medium having a large birefringence effect, such as CDs, and light of another wavelength is used for writing and reading an optical recording medium having a small birefringence effect, such as DVDs, the phase plate functions as a ¼ wavelength plate for the optical recording medium having small birefringence effect and functions as an area-division phase plate for the optical recording medium having large birefringence effect, and thus good writing and reading characteristics are obtained.

Specific examples based on the above-described embodiments of the present invention will be described below.

Example 1

Figure 6:
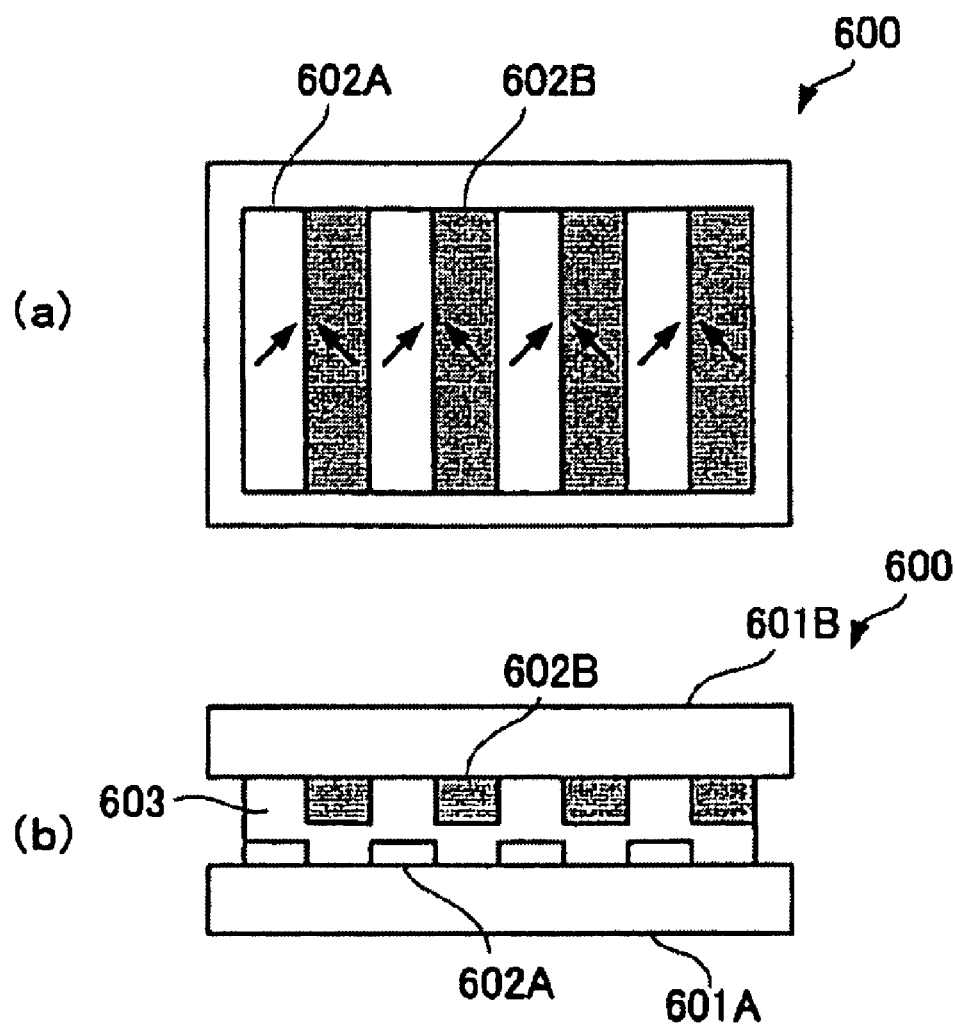
FIGS. 6(a) and 6(b) are schematic views showing a construction of a phase plate according to Example 1 of the present invention.

FIGS. 6(a) and 6(b) are views schematically showing the structure of a phase plate according to Example 1 of the present invention. A phase plate 600 includes a pair of opposing glass substrates 601A and 601B, striped polymer liquid crystals 602A and 602B, which are birefringent, formed between the pair of glass substrates 601A and 601B, and a filler 603 disposed between the polymer liquid crystals 602A and 602B.

Figure 7:
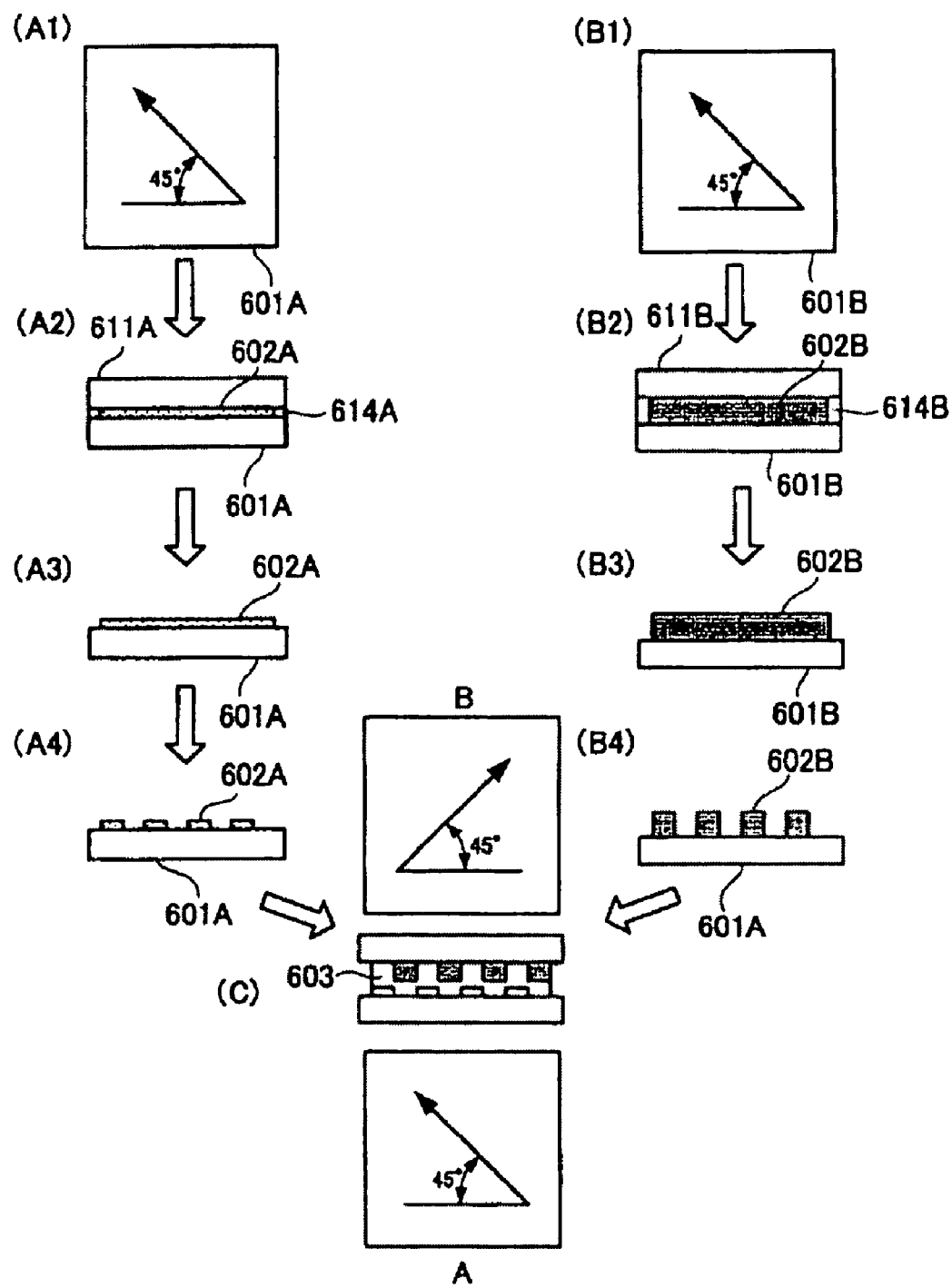
FIG. 7 is a view showing a manufacturing method of the phase plate shown in FIGS. 6(a) and 6(b)

FIG. 7 is a view illustrating a method for manufacturing the phase plate 600. First, an alignment film is formed on the glass substrate 601A, and the film is rubbed in a direction forming 45 degrees counterclockwise from a direction determined in advance as the P polarization direction of the substrate plane to perform alignment treatment (refer to FIG. 7(A1)). In FIG. 7(A1), it is assumed that the direction of P polarization is parallel to the vertical axis. Then, an epoxy-resin type adhesive agent as a material for a seal 614A, is printed at the perimeter of an effective optical area of the substrate plane of the glass substrate 601A where the alignment film has been formed, to form a seal 614A. The thickness of the seal 614A is equal to or more than the thickness in the phase areas 101A for producing the phase difference described above.

Next, a supporting glass plate 611A is thermally press-bonded to the substrate plane of the glass substrate 601A where the seal 614A has been formed, to form a cell, and a raw material of polymer liquid-crystal is injected into the cell by a vacuum injection method. As the raw material of polymer liquid-crystal, a photopolymerizable liquid-crystal compound in which liquid-crystal compounds (1), (2), (3), and (4) represented by the following chemical formulae are mixed at a molar ratio of 1:1:1:1 is used.

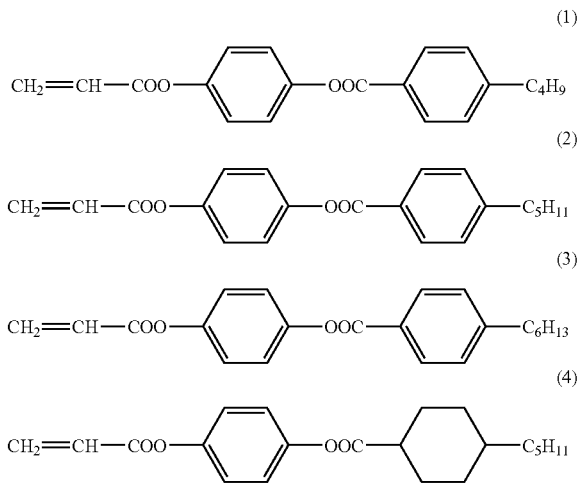

Then, the cell where the raw material of polymer liquid-crystal has been injected is exposed to ultraviolet rays to be cured to form the polymer liquid crystal 602A (refer to FIG. 7(A2)). The polymer liquid crystal 602A has an ordinary refractive index of 1.536 and an extraordinary refractive index of 1.597 at a wavelength of 660 nm; and an ordinary refractive index of 1.532 and an extraordinary refractive index of 1.590 at a wavelength of 785 nm.

Next, the supporting glass plate 611A is removed (refer to FIG. 7 (A3)). The striped polymer liquid crystal 602A is formed by using photolithography technique and etching techniques (refer to FIG. 7(A4)). The interval between stripe portions are set equal to the width of the stripe portions. The polymer liquid crystal 602A thus formed serves as the birefringent medium occupying in the phase areas 101A described in the above embodiment.

Then, in the same way as for the glass substrate 601A, an alignment film is formed on the glass substrate 601B, and the film is rubbed in a direction 45 degrees counterclockwise from a direction determined in advance as the P polarization direction of the substrate plane to perform alignment (refer to FIG. 7(B1)). In FIG. 7(B1), it is assumed that the P polarization direction is parallel to the vertical axis. Then, an epoxy-resin type adhesive agent as a material for a seal 614B, is printed at the perimeter of an effective optical area of the substrate plane of the glass substrate 601B where the alignment film has been formed, to form a seal 614B. The thickness of the seal 614B is equal to or more than the thickness in the phase areas 101B for producing the phase difference described above.

Next, a supporting glass plate 611B is thermally press-bonded to the substrate plane where the seal 614B has been formed, to form a cell, and the raw material of the polymer liquid-crystal material is injected into the cell by the vacuum injection method. Then, the cell in which the raw material of polymer liquid-crystal has been injected is exposed to ultraviolet rays to be cured to form the polymer liquid crystal 602B (refer to FIG. 7(B2)). Next, the supporting glass plate 611B is removed (refer to FIG. 7(B3)). The striped polymer liquid crystal 602B is formed by using the photolithography technique and the etching technique (refer to FIG. 7(B4)). The interval between stripe portions are set equal to the width of the stripe portions. The polymer liquid crystal 602B thus formed serves as the birefringent medium occupying the phase areas 101B described in the above embodiment.

Then, the glass substrate 601A and the glass substrate 601B are piled up such that the substrate plane on which the polymer liquid crystal 602A has been formed faces the substrate plane on which the polymer liquid crystal 602B has been formed and such that the stripe portions of the polymer liquid crystal 602A and the stripe portions of the polymer liquid crystal 602B are alternately arranged as shown in FIG. 1(a) when they are observed from a direction perpendicular to the substrate planes, and the photopolymerization filler 603 is injected between the glass substrates 601A and 601B to make the phase plate 600 (refer to FIG. 7(C)).

In the phase plate 600 formed in this way, the alignment direction of the polymer liquid crystal 602A is indicated in A in FIG. 7(c) and the alignment direction of the polymer liquid crystal 602B is indicated in B in FIG. 7(c) when they are observed from the glass substrate 601B.

Example 2

Figure 8:
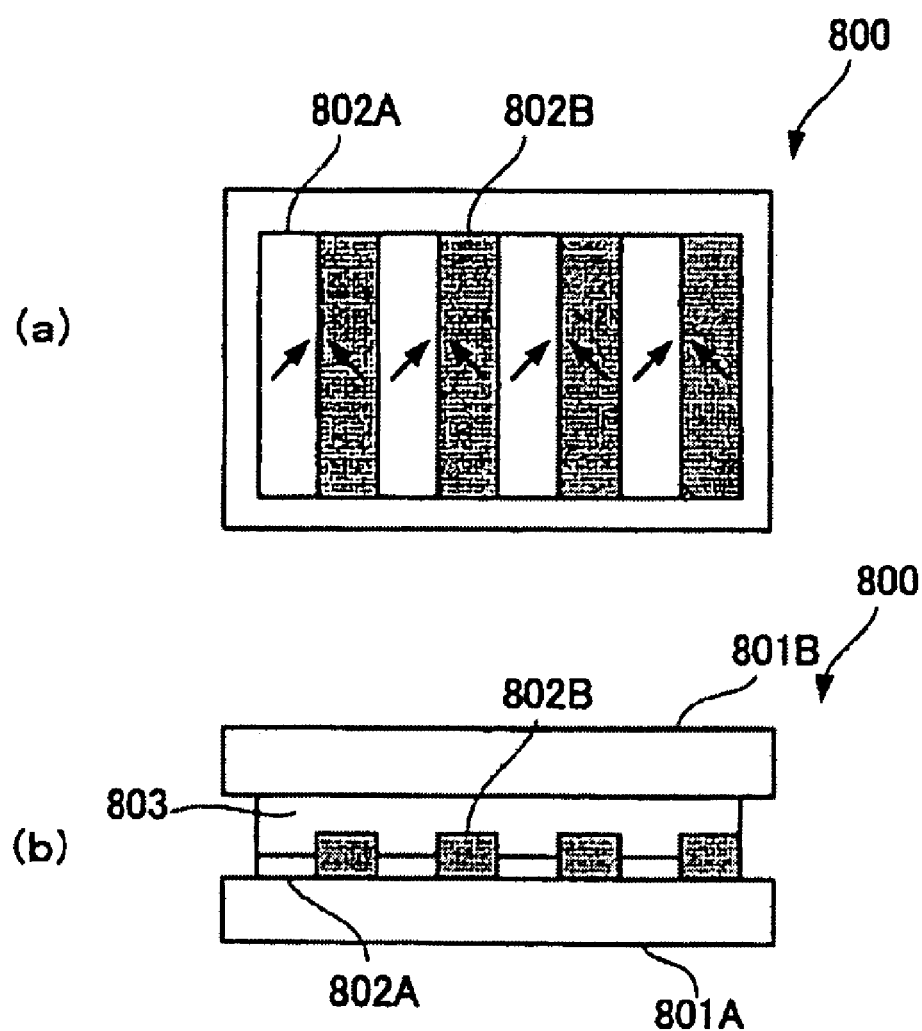
FIGS. 8(a) and 8(b) are schematic views showing the construction of a phase plate according to Example 2 of the present invention.

FIGS. 8(a) and 8(b) are views schematically showing the structure of a phase plate according to Example 2 of the present invention. The phase plate 800 includes a pair of opposing glass substrates 801A and 801B, striped polymer liquid crystals 802A and 802B, which are birefringent, formed between the pair of glass substrates 801A and 801B, and a filler 803 filled over the polymer liquid crystals 802A and 802B. Both of the polymer liquid crystals 802A and 802B are formed on the same glass substrate 801A.

Figure 9:
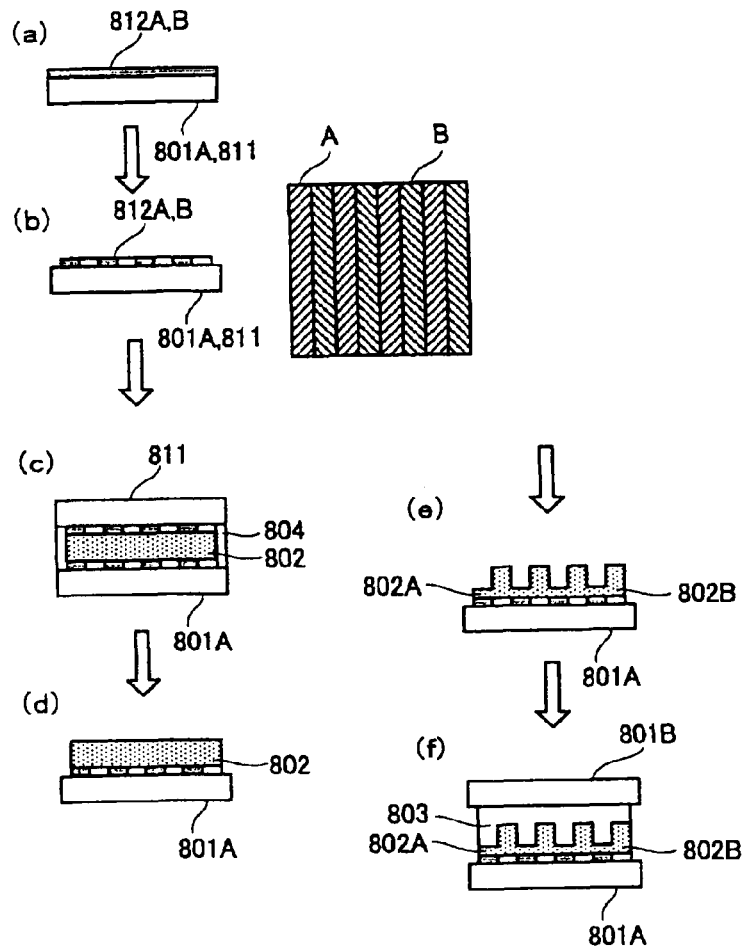
FIGS. 9(a) to 9(f) are views showing a manufacturing method of the phase plate shown in FIGS. 8(a) and 8(b)

FIG. 9 is a view showing a method for manufacturing the phase plate 800. First, a SiON film 812A having a refractive index of, for example, 1.57 is formed on the glass substrate 801A by a CVD method (refer to FIG. 9(a)). Then, by using a photolithography technique and an etching technique, stripe portions indicated by A and B in step (b) in FIG. 9 are formed. The stripe portions indicated by A and B in FIG. 9(b) are ones observed from a direction perpendicular to the substrate plane. The stripe portions A and B have the same width.

In the stripe portions A and B, channels are formed in opposite directions both forming 45 degrees to the boundaries between the stripe portions A and B. Next, in the same way as for the glass substrate 801A, a SiON film 812B is formed on a supporting glass plate 811. Then, in the same way as for the glass substrate 801A, by using a photolithography technique and an etching technique, stripe portions A and B are formed. Next, an epoxy-resin type adhesive agent as a material for a seal 804, is printed at the perimeter of an effective optical area of the substrate plane of the glass substrate 801A where the SiON film 812A has been formed, to form a seal 804.

Next, the supporting glass plate 811 is thermally press-bonded to the substrate plane of the glass substrate 801A where the seal 804 has been formed. Here, the press-bonding is carried out such that the portions A on the glass substrate 801A overlap the portions B on the supporting glass plate 811 and the portions B on the glass substrate 801A overlap the portions A on the supporting glass plate 811 when they are observed from a direction perpendicular to the substrate planes, and so that the SiON film 812A having the channels in the portions A and B, functions as an alignment layer, to form a cell. Then, the same raw material of polymer liquid-crystal as that described in Example 1 is injected into the cell by the vacuum injection method.

Next, the cell in which the raw material of polymer liquid-crystal has been injected is exposed to ultraviolet rays to be cured to form the polymer liquid crystal 802 (refer to FIG. 9(c)). Then, the supporting glass plate 811 is removed (refer to FIG. 9(d)). Here, the stripe-shaped polymer liquid crystals 802A and 802B are formed by using a photolithography technique and an etching technique (refer to FIG. 9(e)). The thickness of the seal 804 is equal to or more than the thickness sufficient for forming the polymer liquid crystal which can produce the phase difference of larger absolute value.

Next, the photopolymerizable filler 803 is applied on the polymer liquid crystals 802A and 802B, and the glass substrate 801B is piled thereon. They are exposed to ultraviolet rays to form the phase plate 800. With this manufacturing method, troublesome work of positioning when glass substrates are piled up can be eliminated.

Example 3

Figure 10:
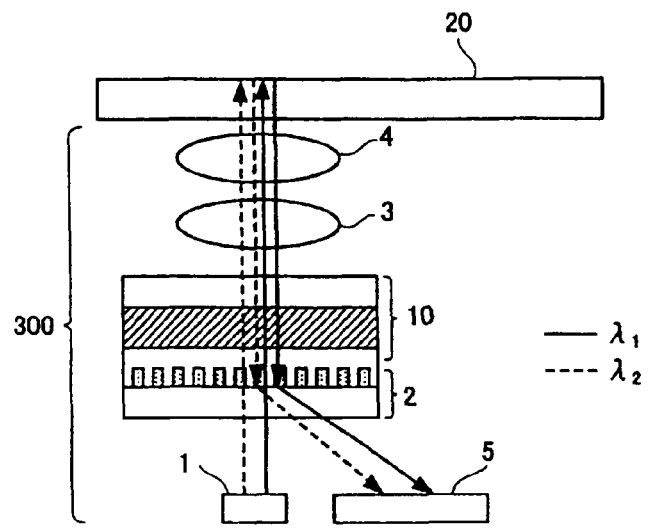
FIG. 10 is a schematic view showing the construction of a conventional optical head device.

FIG. 2 is a view schematically showing the structure of the optical head device according to Example 3 of the embodiment of the present invention. In the optical head device 200, the phase plate 600 according to Example 1 of the present invention is used as the phase plate 100, and a polarizing hologram element is used as the polarizing beam splitter 2. The optical head device 300, whose structure is conceptually shown in FIG. 10, is used as a conventional optical head device. Here, the optical head device 300, a phase plate 10 is mounted such that its optic axis of CDs becomes 45 degrees. In the optical head device 300, the phase plate 10 is a ¼ wavelength plate producing a phase difference of 90 degrees for light of wavelength $\lambda_1$ of 780 nm (used for writing and reading CDs), and a polarizing hologram element is used as the polarizing beam splitter 2.

The amounts of light received by the light-receiving units 5 are compared between the optical head device 200 according to Example 3 and the conventional optical head device 300. First, the optical head device 300 is used to measure as reference data and the amount of S polarized light incident on the light-receiving unit 5 from each of a plurality of CDs having protective layers whose optic axis is 45 degrees and having different phase differences. The reference data is normalized such that the peak of the data is 100%. Next, the optical head device 200 is used to measure as comparison data the amount of S polarized light incident on the light-receiving unit 5 from each of the plurality of CDs. The reference data obtained above is expressed as the curve for a phase difference of 90 degrees and the comparison data is expressed as the curve plotted with white circles in FIG. 4.

A phase plate according to the present invention can also be applied to applications such as phase plates or optical head devices for which it is beneficial to suppress changes of the amount of light incident on a light-receiving unit even if phase difference produced by transmission of light through a protective layer of an optical recording medium differs depending on the type of optical recording medium.

The entire disclosure of Japanese Patent Application No. 2005-122609, filed on Apr. 20, 2005, including the specification, claims, drawings and abstract, is incorporated herein by reference in its entirety.

What is claimed is:

1. A phase plate, comprising
a birefringent medium, to cause a phase difference in linearly polarized light incident on the phase plate between a polarization component having a polarization direction parallel to an optic axis of the birefringent medium and a polarization component having a polarization direction perpendicular to the optic axis,
wherein the birefringent medium comprises a plurality of types of phase areas;
two types of adjacent phase areas among the plurality of types of phase areas are different from each other in at least one of a phase difference and an optic axis; and
each of the plurality of types of phase areas is disposed so as to have two-fold rotational symmetry with respect to an optical axis of the phase plate; and
wherein phase differences produced when light having at least one of a plurality of different wavelengths is transmitted through the plurality of types of phase areas are each (90×m+360×k+α) degrees,
wherein m indicates an integer of −1 or +1, k indicates an integer, and α indicates a real number of at least −20 and at most +20, and
wherein differences between the phase differences produced when light having at least one of the plurality of different wavelengths is transmitted through the plurality of types of phase areas are each (360×j+β) degrees wherein j indicates an integer, and β indicates a real number of at least −40 and at most +40.

2. The phase plate according to claim 1,
wherein the birefringent medium comprises a first-type phase area and a second-type phase area; and
the phase difference produced by the first-type of phase area differs from the phase difference produced by the second-type phase area.

3. The phase plate according to claim 1,
wherein a part or a whole of the birefringent medium is made of a liquid crystal;
a plurality of channels is provided in each of the plurality of types of phase areas so as to contact the liquid crystal and so as to be parallel to an optic-axis direction of the phase area; and
the liquid crystal is aligned along the plurality of channels.

4. The phase plate according to claim 1, wherein a part or a whole of the birefringent medium is made of a polymer liquid crystal.

5. An optical head device comprising:
a light source for emitting light having the plurality of different wavelengths;
an objective lens for focusing the light emitted from the light source onto an optical recording medium; and
a light-receiving unit for detecting light returning from the optical recording medium;
wherein the optical head device further comprises:
the phase plate as defined in claim 1 disposed in an optical path between the objective lens and the light source; and
wherein the light returning from the optical recording medium is transmitted through the phase plate.

6. The optical head device according to claim 5, further comprising a polarizing beam splitter in an optical path between the light source and the phase plate.

7. The optical head device according to claim 5, wherein the plurality of different wavelengths includes light in a 780 nm band for writing and reading CDs and light in a 660 nm band for writing and reading DVDs.

* * * * *